United States Patent
Wycech

(10) Patent No.: US 7,300,616 B2
(45) Date of Patent: Nov. 27, 2007

(54) METHOD AND APPARATUS FOR FORMING AN ARTICLE OF MANUFACTURE AND AN ARTICLE OF MANUFACTURE MADE BY A NEW AND NOVEL PROCESS

(76) Inventor: Joseph S. Wycech, 927 Lake Shore Rd., Gross Pointe Farms, MI (US) 48236

( * ) Notice: Subject to any disclaimer, the term of this patent is extended or adjusted under 35 U.S.C. 154(b) by 514 days.

(21) Appl. No.: 10/816,624

(22) Filed: Apr. 2, 2004

(65) Prior Publication Data
US 2005/0221074 A1    Oct. 6, 2005

(51) Int. Cl.
*B29C 39/02* (2006.01)
(52) U.S. Cl. .................. 264/299; 264/50; 264/69; 264/DIG. 6
(58) Field of Classification Search .......... 264/50, 264/53, 54, 69, 299, DIG. 6
See application file for complete search history.

(56) References Cited

U.S. PATENT DOCUMENTS

| 4,131,481 | A  | * | 12/1978 | Drake et al. .................. 521/91 |
| H2047 | H | * | 9/2002 | Harrison et al. ......... 428/297.4 |
| 6,787,579 | B2 | * | 9/2004 | Czaplicki et al. ............. 521/54 |

* cited by examiner

*Primary Examiner*—Allan R. Kuhns
(74) *Attorney, Agent, or Firm*—Law Offices of John Chupa & Associates, P.C.

(57) ABSTRACT

A method 10 to selectively produce an article of manufacture 20 having desirable properties and which may replace many "ceramic based" articles. Particularly, the article of manufacture 20 is made by selectively combining an epoxy structural foam material 110 with a catalyst 111 and a drying agent 200. The mixed material is then selectively dispensed within a mold 16 and allowed to harden in order to form the article of manufacture 20. Alternate formulations may be utilized. Other various non-limiting embodiment of the invention are also disclosed.

17 Claims, 2 Drawing Sheets

METHOD AND APPARATUS FOR FORMING AN ARTICLE OF MANUFACTURE AND AN ARTICLE OF MANUFACTURE MADE BY A NEW AND NOVEL PROCESS

FIELD OF THE INVENTION

The present invention generally relates to a method and an apparatus for forming an article of manufacture and to an article of manufacture made by and made from a new and novel process and, more particularly by way example and without limitation, to a method and apparatus which allows an article of manufacture to be made in a cost effective manner, having properties which are highly desirable, and to be made in a variety of shapes and sizes, thereby increasing the overall utility and usefulness of the process and, by way of further example and without limitation, to allow the formed articles of manufacture to replace current "ceramic type" articles which suffer from various drawbacks.

BACKGROUND OF THE INVENTION

"Ceramic type" article of manufactures are used in a wide variety of applications and form many common articles used by the general public. Some non-limiting examples of these articles include toilet bowels and kitchen sinks. Particularly, such articles' are made by the use of traditional types of clay material which is generally formed into a desired shape and then placed within and heated by kilns. The heat causes the clay to harden and the hardened articles are then removed from the kiln, and "finished" by hand, and then conventionally coated with porcelain which is then baked onto the hardened clay article.

While the foregoing ceramic type articles do provide a desired function, they suffer from many drawbacks. For example, the foregoing article creation process is labor intensive, thereby greatly increasing the cost of producing these articles. Since the formed articles are relatively heavy, the labor costs cannot be economically reduced by creating the articles in a location, relatively far away from their intended use, where labor costs are inexpensive (i.e., while labor costs may be reduced, the shipping costs would greatly increase).

Further, the foregoing process also does not economically allow these conventional articles to be produced of greatly varying size and shapes and the required "hand finishing" oftentimes causes inadvertent damage and/or destruction to the formed article, thereby further increasing overall cost.

Particularly, by way of example and without limitation, ceramic articles are typically cast by the use of a two or three piece mold, and further require a "post curing" kiln process. The use of such a "multi-piece" mold and the foregoing kiln process, accounts for a relatively large and undesirable overall production or "cycle" time, relatively high production cost, relatively large production of "floor space", and increases the likelihood of errant operation due to the multiple steps and apparatuses required to complete the overall article formation process. The foregoing process also further suffers from "material slump" as the dispensed material hardens within the mold, thereby further increasing the overall production cost as these hardened articles must typically be discarded and are of no further use.

There is therefore a need for a process, material strategy/technique, and apparatus to address the foregoing drawbacks such as, by way of example and without limitation, to reduce the occurrences and/or severity of, material slump, reduce overall production cycle time, eliminate the post curing kiln process, and eliminate the required porcelain application.

There is a further need to provide such an improved process, material, and apparatus, and strategy/technique to the production of sinks, countertops, toilet fixtures, and other articles of manufacture which have traditionally been formed according to the previously delineated ceramic manufacturing technique and/or strategy. The foregoing needs are addressed and are fulfilled by the present invention, and the present invention may, in at least one embodiment, fulfill these needs by the use of an open casting mold.

There is therefore a need for a process, material, strategy/technique and apparatus to address the foregoing drawbacks such as, by way of example and without limitation, to reduce the occurrences and/or severity of material slump, reduce overall production cycle time, and eliminate the post curing kiln process. There is a further need to provide such an improved process, material, and apparatus to the production of sinks, countertops, toilet fixtures, and other articles of manufacture which have traditionally been formed according to the previously delineated ceramic manufacturing technique and/or strategy. The foregoing needs are addressed and fulfilled by the present invention, and the present invention may, in at least one embodiment, fulfill these needs by the use of an open casting mold.

In sum, there is therefore a need for a new and novel method and apparatus, materials and/or strategy/technique to produce articles of manufacture which overcomes at least some of the previously delineated drawbacks associated with the production of these "ceramic type" articles and which may be used to produce articles to replace other "non-ceramic" types of articles.

SUMMARY OF THE INVENTION

It is a first non-limiting object of the present invention to provide a method and apparatus and strategy and technique which selectively allows articles of manufacture to be made in a manner which overcomes some or all of the previously delineated drawbacks associated with the creation of "ceramic type" articles of manufacture.

It is a second non-limiting object of the present invention to provide a method and an apparatus which selectively allows articles of manufacture to be made in a wide variety of sizes and shapes and having desirable properties.

It is a third non-limiting object of the present invention to provide a method and an apparatus for producing articles of manufacture in a cost effective manner.

It is a fourth non-limiting object of the present invention to provide an article of manufacture having properties which are superior to "ceramic type" articles of manufacture and which may be produced in a cost effective manner.

It is a fifth non-limiting object of the present invention to utilize a drying agent or "cure accelerator" to reduce "in-mold" cycle time and to quickly cure articles of manufacture or "parts" which are relatively light, small, and of complex overall spatial geometry.

It is a sixth non-limiting object of the present invention to provide a drying agent or "cure accelerator" which could selectively comprise heated air, if utilized in combination with syntactic cement or epoxy foam material (as if fully delineated below), or carbon dioxide, if utilized with epoxy foam (as if fully delineated below). Particularly, the use of a gas entrained mix, whether it be a mixture including a syntactic cement or an epoxy foam, results in a density reduction of the mixed materials exiting the dispensing assembly, thereby reducing the possibility or likelihood of material slumping or a loss of character features, such as a bowl rim or bowl shape.

It is a seventh non-limiting object of the present invention to enhance the curing of the mixed and dispensed materials by the addition of a catalyzed water based epoxy or an acrylic latex mixed into a syntactic cement. For the epoxy foam material, the addition of a cyanoacrylate can increase overall cure speed and mix viscosity, thereby reducing the possibility of material slumping. These ingredients, when exposed to heated air, will cause the catalyzed mixture to react faster regardless of the mass or the size of the dispensed volume or shot size. The water based epoxies, acrylic latex, and cyanoacrylate would be mixed in the main ingredient in the main reservoir before the introduction of a curing agent and a gas catalyst within the dispensing assembly.

According to first non-limiting aspect of the present invention, a method is provided for creating an article of manufacture. Particularly, the method includes the steps of providing a structural epoxy foam material; providing a catalyst; mixing the structural epoxy foam material with the catalyst, thereby creating a certain mixture; creating a mold; placing the certain mixture within the created mold; and allowing the certain mixture to harden within the created mold, thereby forming the article of manufacture.

According to a second non-limiting aspect of the present invention, a method is provided for creating an article of manufacture. Particularly, the method includes the steps of providing a syntactic cement material; providing a catalyst; mixing the syntactic cement material with the provided catalyst, thereby creating a certain mixture; creating a mold; placing the certain mixture within the created mold; and allowing the certain mixture to harden within the created mold, thereby creating the article of manufacture.

According to a third non-limiting aspect of the present invention, an apparatus for selectively forming an article of manufacture is provided. Particularly, the apparatus includes a mold; a reservoir of a catalyst; a reservoir of a structural foam material; a pump which is physically and communicatively coupled to the reservoir of structural foam material; a mixing head assembly which is physically and communicatively coupled to the pump and which includes an auxiliary input port and an output port; a source of gas which is physically and communicatively coupled to the auxiliary input port; a mixing assembly which is physically and communicatively coupled to the output port of the mixing head assembly; and a controller which is controllably coupled to the pump, to the source of gas, and to the mixing assembly and wherein the controller is adapted to selectively cause at least a portion of the reservoir of structural foam material to be communicated to the input port of the mixing head assembly thereby causing at least a portion of the source of gas to be communicated to the auxiliary input port of the mixing head assembly thereby causing at least the portion of the source of gas to mix with the at least the portion of the reservoir of structural foam within the mixing head assembly to form a certain material, the controller further selectively causing the formed certain material to be communicated to the mixing assembly and causing the formed certain material to mix with at least a portion of the catalyst material within the mixing assembly to form a certain second material and further selectively causing at least a portion of the formed certain second material to be selectively dispensed from the mixing assembly to the mold, thereby allowing the certain second material to form the article of manufacture within the mold.

According to a fourth non-limiting aspect of the present invention, an apparatus for selectively forming an article of manufacture is provided. Particularly, the apparatus includes a mold; a reservoir of a catalyst; a reservoir of a syntactic cement; a pump which is physically and communicatively coupled to the reservoir of syntactic cement; a mixing head assembly which is physically and communicatively coupled to the pump and which includes an auxiliary input port and an output port; a source of gas which is physically and communicatively coupled to the auxiliary input port; a mixing assembly which is physically and communicatively coupled to the output port of the mixing head assembly; and a controller which is controllably coupled to the pump, to the source of gas, and to the mixing assembly and wherein the controller is adapted to selectively cause at least a portion of the reservoir of syntactic cement to be communicated to the input port of the mixing head assembly while causing at least a portion of the source of gas to be communicated to the auxiliary input port of the mixing head assembly thereby causing at least the portion of the source of gas to mix with the at least the portion of the reservoir of syntactic cement within the mixing head assembly to form a certain material, the controller further selectively causing the formed certain material to be communicated to the mixing assembly and causing the formed certain material to mix with at least a portion of the catalyst material within the mixing assembly to form a certain second material and further selectively causing at least a portion of the formed certain second material to be selectively dispensed from the mixing assembly to the mold, thereby allowing the certain second material to form the article of manufacture within the mold.

According to a fifth non-limiting aspect of the present invention, an article of manufacture is provided. Particularly, the provided article of manufacture is made by the process of mixing a structural foam material with a catalyst material to form a selectively mixed material; placing the selectively mixed material into a mold; and allowing the selectively mixed material to harden within the mold, thereby forming the article of manufacture.

According to a sixth non-limiting aspect of the present invention, an article of manufacture is provided. Particularly, the provided article of manufacture is made by the process of mixing a syntactic cement material with a catalyst material to form a selectively mixed material; placing the selectively mixed material into a mold; and allowing the selectively mixed material to harden within the mold, thereby forming the article of manufacture.

These and other aspects, objects, and advantages of the present inventions will become apparent to one of ordinary skill in the art by reading the following detailed description of the preferred embodiment of the invention and by reference to the following drawings. It should be appreciated that the foregoing inventions will allow for the casting of an article of manufacture or "part" to be done relatively quickly and will reduce the use of an extensive drying oven in the case of an article which is made with syntactic cement.

DETAILED DESCRIPTION OF THE PREFERRED EMBODIMENTS OF THE INVENTION

Figure 1:
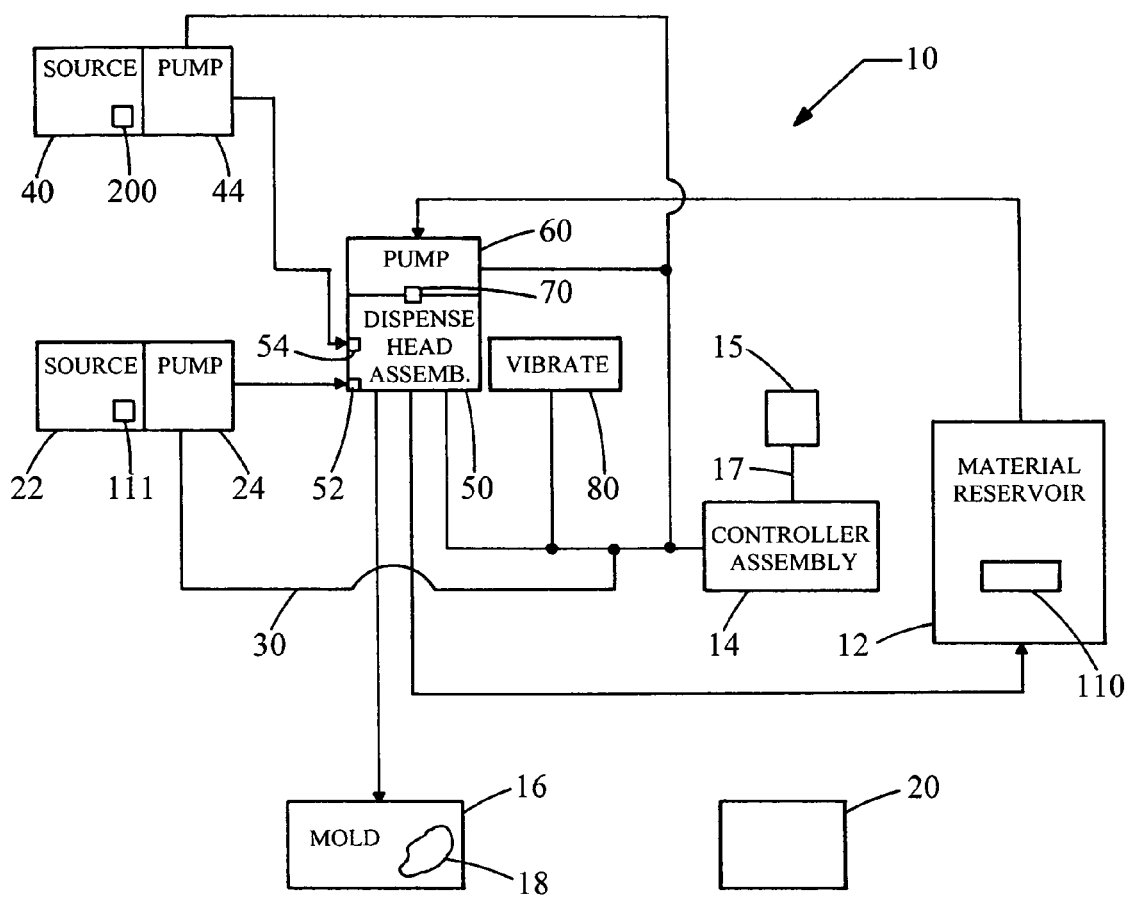
FIG. 1 is a block diagram of an article creation apparatus made in accordance with the teachings of the preferred embodiments of the invention.

Referring now to FIG. 1, there is shown a article creation apparatus 10 which is made in accordance with the teachings of the preferred embodiments of the invention.

Particularly, the apparatus 10 includes a material reservoir 12 which, in one non-limiting embodiment of the invention, contains structural epoxy foam resin material such as but not limited to a material from the family of structural foam materials commonly known as Terocore® and available from the Henkel Corporation. The apparatus 10 further includes a controller assembly 14 which is operable under stored program control and which, in one non-limiting embodiment of the invention, comprises a Dell® type computer operating in a Windows® environment. Other computer and other software may be utilized in other embodiment of the invention.

The apparatus 10 further includes a mold 16 which is adapted to have a cavity 18 which conforms to the size and shape of a desired part or article of manufacture 20.

The apparatus 10 further includes a catalyst source 22 which is operably coupled to a pump 24. The pump 24 is controllably coupled to the controller assembly 14 by the use of bus 30. The apparatus 10 further includes a source of a drying agent 40 which is also operably connected to a pump 44. The pump 44 is also controllably coupled to the controller 14 by the use of the bus 30.

As is further shown in FIG. 1, the apparatus 10 further includes a dispensing head assembly 50 having a first input port 52 which is communicatively coupled to the pump 24 and a second input port 54 which is communicatively coupled to the pump 44. The apparatus 10 also includes a pump 60 which is communicatively and operably coupled to the material reservoir 12 and which is further communicatively coupled to the input port 70 of the dispensing head assembly 50. The controller assembly 14 is controllably coupled to the pump 60 by the use of bus 30. In an alternate embodiment of the invention, the apparatus 10 includes a vibration assembly 80 which is physically coupled to the dispensing head assembly 50 and which is controllably coupled to the controller assembly 14 by the use of bus 30. In one non-limiting embodiment of the invention, the dispensing head assembly 50 may comprise a model "Twin-mixer III" which is provided by the Liquid Control Corporation of North Canton, Ohio and the pump may comprise a model "PosiFlow" programmable continuous flow metering pump or "zero shear pump" which is also provided by the Liquid Control Corporation. The apparatus 10 also includes a source of electrical energy 15 which is physically and communicatively coupled to the controller assembly 14 by the use of bus 17.

Figure 2:
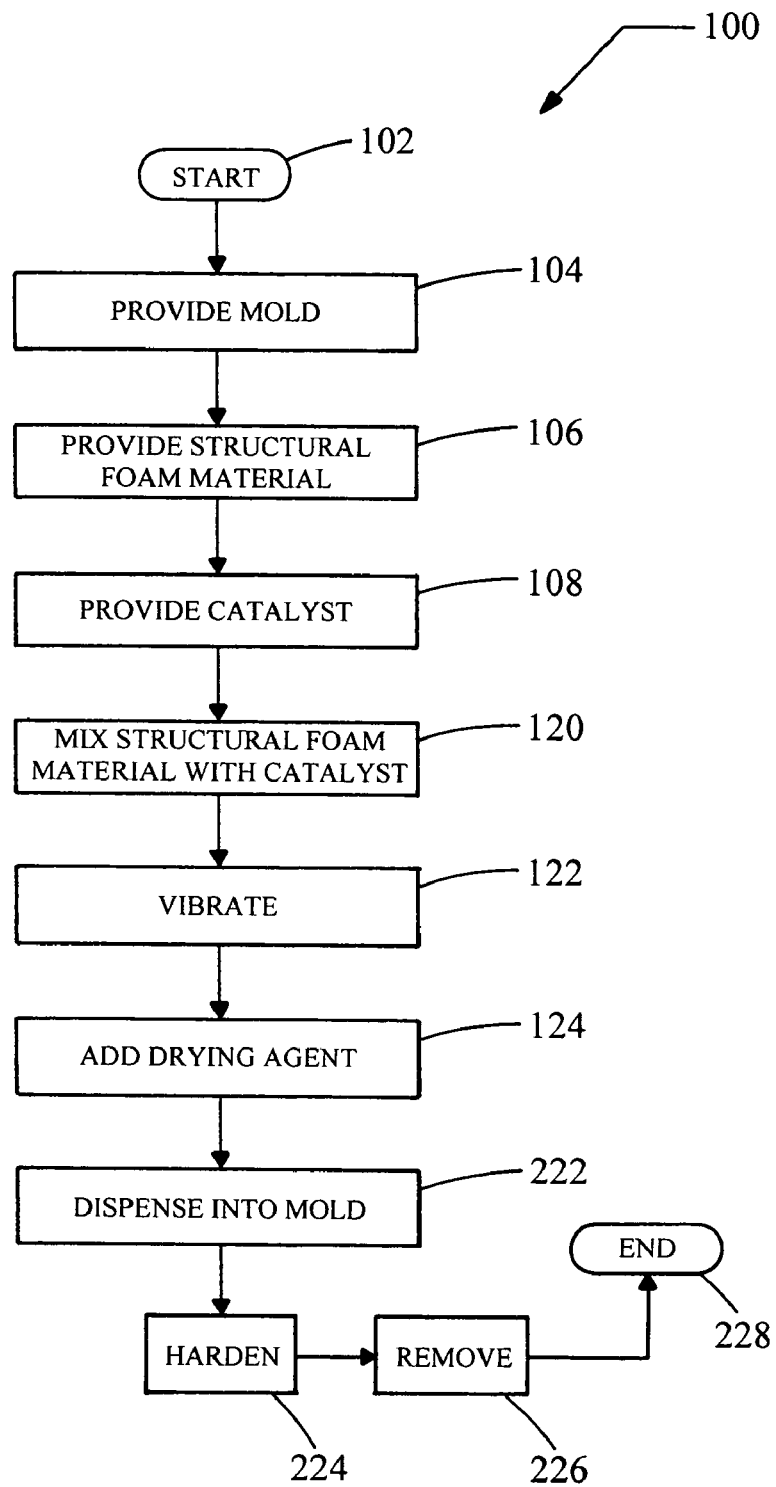
FIG. 2 is a flow chart illustrating the sequence of steps associated with and comprising a first article formation methodology of the various preferred embodiments of the invention.

Referring now to FIG. 2, there is shown a flow chart 100 which illustrates one methodology 100 which may be used according to the various preferred embodiments of the invention. Particularly, the methodology 100 includes a first step 102 in which all of the various foregoing elements of the apparatus 10 are "reset" or made ready to begin the overall process 100. The first step 102 is followed by step 104 in which a mold, such as mold 16, is created or provided and which has a desired cavity 18 having a size and a shape which conforms to the size and the shape of a desired article of manufacture, such as article of manufacture 20, which may comprise a sink, toilet bowl, or countertop or substantially any other desired product.

Step 104 is followed by step 106 in which the structural epoxy foam resin material 110 is provided within the reservoir 12. Step 106 follows step 104 and, in this step 106, a catalyst material 111 is provided within the source reservoir 22. In one non-limiting embodiment of the invention, this catalyst material 111 comprises an Amine type catalyst, although other catalyst materials may be utilized. Step 108 is followed by step 120 in which the catalyst material 111 is mixed with the structural epoxy foam resin material 110 within the head assembly 50. Particularly, by way of example and without limitation, such mixing occurs after the controller assembly 14 selectively activates the pumps 60 and 24 (e.g., by sourcing electrical energy to these pumps 24, 60 from the source 15 and by the use of bus 30), to respectively cause the materials 110 and 111 to be communicated into the head assembly 50. In an alternate embodiment of the invention, the controller assembly 14 also selectively activates the vibration assembly 80, by sourcing electrical energy to the vibration assembly 80 from the source 15 and by the use of bus 30. This vibration occurs in step 122 which follows step 120. Step 124 follows either step 122 or step 120 (i.e., if no vibrational operation is utilized, step 120 is followed directly by step 124). In the step 124, the controller assembly 14 sources electrical energy, from the electrical energy source 15 to the pump 44, to cause the drying agent 200 to be communicated into the head assembly 50 as the structural epoxy foam resin material 110 and the catalyst 111 are being mixed within the head assembly 50. In yet another alternate embodiment of the invention, the drying agent may first be heated before it is communicated into the head assembly 50. In one alternate embodiment of the invention, the drying agent 200 comprises air or another gas such as $CO^2$. In yet another alternate embodiment of the invention, the mixed material 110, catalyst 111, and the drying agent 200 are each vibrated within the head assembly 50 as they are selectively mixed within the head assembly 50. The drying agent may be thought of as a "cure accelerator" and, as earlier stated, may alternatively comprise carbon dioxide if utilized with epoxy foam material.

Step 222 follows step 124 and, in this step 222, the mixed material within the head assembly 50 is dispensed into the mold 20 (i.e., into the formed cavity 18 within the mold 20). Step 224 follows step 222 and, in this step 224, the dispensed material is allowed to harden. Step 226 follows step 224 and, in this step 224, the hardened material is removed from the mold 20, thereby forming an article of manufacture 20. Step 228 follows step 226 and represents the conclusion of the methodology 100. It should be appreciated that the after the article 20 is removed from the mold, it may be finished in a desired manner (e.g., by painting or placing another desired material upon it). Other materials may be utilized within the foregoing process.

In an alternate embodiment of the invention, the material 110 comprises a combination of syntactic cement and water, the catalyst material 111 comprises catalyzed water based epoxy, and the material 200 comprises heated air. In a further non-limiting embodiment of the invention, the material 110 comprises a combination of syntactic cement, water, and fiberglass, the material 111 comprises a catalyzed water based epoxy, and the material 200 comprises heated air.

In yet another non-limiting embodiment, the material 110 comprises a combination of syntactic cement, water, fiberglass, and microspheres; the material 111 comprises a catalyzed water based epoxy; and the material 200 comprises heated air. In other non-limiting embodiment, the catalyzed water based epoxy material, in each instance, may be replaced by an acrylic latex material.

In yet another non-limiting embodiment, the material 110 may comprise a cyanoacrylate resin material which is used only with heated air 200. In yet another non-limiting embodiment, material 110 comprises an structural epoxy foam material, material 111 comprises the combination of an amine catalyst and a small amount of cyanoacrylate, and material 200 comprises heated air.

In yet another non-limiting embodiment, material 110 comprises the combination of syntactic cement, water based epoxy, water, fiberglass and/or microspheres; material 200 comprises heated air; and material 111 is not utilized.

In yet another non-limiting embodiment, material 110 comprises the combination of syntactic cement, acrylic latex, water, and fiberglass and/or microspheres; material 200 comprises heated air; and material 111 is not utilized.

It should be appreciated that the article of manufacture 20 is very resistant to acid damage, and damage due to associated with elevated temperatures. The article of manufacture 20 is also lightweight, and may be configured in a wide variety of sizes and shapes and has the strength and structural integrity of ceramic based articles of manufacture. Hence, the article of manufacture 20 may comprise a toilet bowl, sink, countertop, oven or dryer door or virtually any other desired article. It should be further appreciated that placing the drying agent within the head assembly 50, as opposed to communicating the drying agent to the reservoir 12, allows the dispensing material to have a relatively constant compressibility and better control. That is, the foam compresses as it is pumpably communicated to the head and placing a drying agent within the foam, before it is pumped, will cause the foam to have uneven compressibility and cause the pump 60 to expend greater and variable amounts of energy. Further, in the case of the syntactic cement that is pre-mixed with acrylic latex, this process presents or reduces the likelihood of premature curving in the reservoir 12. It should be further appreciated that the use of a gas entrained mix, whether it be a mixture including a syntactic cement or an epoxy foam, results in a density reduction of the mixed material exiting the dispensing assembly thereby reducing the possibility or likelihood of material slumping or a loss of character features, such as a bowl ring or a bowl shape.

It is to be understood that the invention is not limited to the exact construction and method which has been illustrated, but that various changes and modifications may be made without departing from the spirit and the scope of the inventions as they are delineated in the following claims.

What is claimed is:

1. A method of creating an article of manufacture, said method comprising the steps of
    providing a syntactic cement material in a first reservoir;
    providing a catalyst in a second reservoir;
    providing a mixing head assembly;
    mixing said syntactic cement material, from said first reservoir, with said catalyst,
    from said second reservoir, only within said mixing head assembly;
    providing a drying agent in a third reservoir;
    providing said drying agent from third reservoir within said mixing head assembly as said syntactic cement material and said catalyst are being mixed while preventing said drying agent from being communicated to said first and second reservoirs;
    mixing said received drying agent with said syntactic cement material and said catalyst as said catalyst and said syntactic cement material are being mixed within said mixing head assembly, thereby creating a certain mixture;
    creating a mold;
    placing said certain mixture within said created mold by communicating said certain mixture from said mixing head assembly into said mold, wherein said placement of said drying agent into said mixing assembly and said prevention of said drying agent from being communicated to said first and second reservoirs allows said certain mixture to have constant compressibility; and
    allowing said certain mixture to harden within said created mold, thereby forming said article of manufacture.

2. The method of claim 1 wherein said catalyst material comprises water.

3. The method of claim 1 wherein said catalyst material comprises acrylic latex.

4. The method of claim 1 further comprising the steps of providing a certain amount of microsphere material; and mixing said certain amount of said microsphere material with said syntactic cement material.

5. The method of claim 4 wherein said article of manufacture comprises a sink.

6. The method of claim 4 wherein said article of manufacture comprises a toilet bowl.

7. The method of claim 1 wherein said article of manufacture comprises a kitchen countertop.

8. The method of claim 1 wherein said article of manufacture comprises a countertop.

9. The method of claim 4 wherein said drying agent comprises air.

10. The method of claim 4 wherein said drying agent comprises carbon dioxide.

11. The method of claim 9 further comprising the step of heating said air.

12. The method of claim 10 further comprising the step of heating said carbon dioxide.

13. The method of claim 1 wherein said syntactic cement material comprises syntactic cement and water.

14. The method of claim 1 wherein said syntactic cement material comprises a mixture of syntactic cement, water, and fiberglass.

15. The method of claim 1 wherein said syntactic cement material comprises a mixture of syntactic cement, water, fiberglass and microspheres.

16. The method of claim 1 wherein said syntactic cement material comprises a mixture of syntactic cement, water based epoxy, water, and fiberglass.

17. The method of claim 1 wherein said syntactic cement material comprises a mixture of syntactic cement, water based epoxy, water, fiberglass, and microspheres.

* * * * *